United States Patent [19]

Costanza et al.

[11] 4,101,399

[45] Jul. 18, 1978

[54] PRODUCTION OF SOLVENT RESISTANT BROMINATED AND/OR CHLORINATED AROMATIC POLYESTER FIBROUS MATERIALS

[75] Inventors: John R. Costanza, North Plainfield; George L. Collins, New Providence, both of N.J.

[73] Assignee: Celanese Corporation, New York, N.Y.

[21] Appl. No.: 664,461

[22] Filed: Mar. 8, 1976

[51] Int. Cl.$^2$ .............................................. C08G 18/00
[52] U.S. Cl. ...................... 204/159.19; 8/DIG. 4; 8/DIG. 12; 260/45.75 B; 528/308
[58] Field of Search ............... 204/159.19; 260/75 H, 260/869, 75 T, 47 C; 8/DIG. 12, DIG. 4

[56] References Cited

U.S. PATENT DOCUMENTS

| | | | |
|---|---|---|---|
| 3,455,689 | 7/1969 | Laridon et al. | 96/35.1 |
| 3,496,839 | 2/1970 | Hartle | 204/159.19 |
| 3,518,175 | 6/1970 | Bell | 204/159.19 |
| 3,766,140 | 10/1973 | Ismail | 260/47 C |
| 3,786,022 | 1/1974 | Hata et al. | 260/47 C |
| 3,824,211 | 7/1974 | Howerton | 260/47 C |
| 3,824,213 | 7/1974 | Stackman | 260/47 C |
| 3,953,405 | 4/1976 | Feinaver et al. | 204/159.19 X |

*Primary Examiner*—Murray Tillman
*Assistant Examiner*—Thurman K. Page

[57] ABSTRACT

This invention relates to the irradiation of compositions comprising non-ethylenically unsaturated brominated and chlorinated aromatic polyester fibrous materials with low intensity ultraviolet light radiation for relatively brief periods of time under appropriate conditions to yield a product of enhanced solvent resistance. The irradiation of the halogenated polyesters (as defined) generates free radicals within the fibrous material which react to produce sufficient cross-linking to enhance solvent resistance without a significant detrimental change of other product properties.

19 Claims, No Drawings

PRODUCTION OF SOLVENT RESISTANT BROMINATED AND/OR CHLORINATED AROMATIC POLYESTER FIBROUS MATERIALS

BACKGROUND OF THE INVENTION

It has been well known for a number of years that saturated polymeric substances are modified when subjected to bombardment with high energy particulate radiation including accelerated charged particles such as electrons and protons and the particles emitted by nuclear fission. See, for example, U.S. Pat. No. 2,951,024. It has also been known that *ethylenically unsaturated* polymers may be irradiated with ultraviolet light to yield polyesters having improved properties such as increased tensile strength, and increased solvent resistance. See, for example, U.S. Pat. No. 3,496,839. Additionally, it is known to treat polymers with a combination of ultraviolet, visible, and infrared *high intensity* radiation to form polymer cross-links which result in improvements in many of the above-mentioned properties. See, for example, U.S. Pat. No. 3,650,699. It is further known that the use of *low intensity* ultraviolet radiation from mercury lamps to effect cross-linking of certain polymers (e.g., saturated non-halogenated polymers) requires extended periods of exposure and in some instances is completely ineffective. See U.S. Pat. No. 3,650,699. Excessive exposure of many of the cross-linkable polymers to this type of radiation source may result in discoloration, stiffness, lessened strength, broken fils, dullness, and ever charring. It is still further known to introduce cross-linking into polymers by adding cross-linking promoters to the polymers prior to their irradiation. See, for example, U.S. Pat. No. 2,961,389. It has also been generally observed that the efficiency of *high energy* particles in cross-linking polymers is quite low. See, for example, U.S. Pat. No. 2,961,389. Hence, relatively heavy irradiation doses, which are expensive to produce and time-consuming to apply, are required to obtain cross-linking of *saturated polymers* which in turn improves the solvent resistance of the compounds so cross-linked. Further, in many instances this form of radiation has a degradative effect on the material being treated. It has been further observed that those methods of inducing cross-linking of polymers which involve the use of promoters have the disadvantages of lengthy induction periods, and temperature variation during treatment.

The present invention is unique in that it discloses a method for enhancing solvent resistance of *non-ethylenically* unsaturated brominated or chlorinated fibrous polyester materials by exposing these compounds to low intensity and low energy ultraviolet radiation for extremely short periods of time.

Saturated polymers are difficult to cross-link because there is no position on the polymer where cross-linking can take place in the conventional manner associated with unsaturated polymers. In the presently claimed invention the halogenated positions of the saturated polymer provide a site for cross-linking upon exposure to ultraviolet radiation. Such exposure liberates radicals which in turn react with each other to form cross-linked structures.

Brominated and chlorinated aromatic polyesters have been used to produce a number of inherently non-burning fibrous materials which offer the public a great degree of fire safety, particularly when fibrous articles are required for use in fire-control environments, e.g., children's sleepwear, suits for fire fighters, hospital furnishings, uniforms for military and civilian flight personnel, etc. However, the fabrics made from these materials tend to dissolve, to at least some degree or to be otherwise adversely influenced, when contacted with hydrocarbons or conventional dry cleaning fluids such as tri-chloroethylene, perchloroethylene, tetrachloroethylene, tetrachloroethane, chloroform, carbon tetrachloride, methylene chloride, and Stoddard solvent.

It is therefore an object of this invention to provide a method for decreasing the solubility in conventional dry cleaning solvents of brominated or chlorinated non-ethylenically unsaturated aromatic polyester fibrous materials in less time and with lower energy requirements than have heretofore been required.

It is another object of this invention to provide a method for the treatment of solid preformed brominated or chlorinated aromatic polyester fibrous materials which enhances solvent resistance without a significant detrimental change in other product properties, such as, for example, discoloration to the exposed substrate.

It is still another object of the present invention to provide a substantially solvent resistant brominated or chlorinated aromatic polyester fibrous product which also possesses increased thermal dimensional stability, and increased water resistance.

These and other objects as well as the scope, nature and utilization of the invention will be apparent to those skilled in the art from the following description and appended claims.

SUMMARY OF THE INVENTION

It has been found that a process for rendering a halogenated fibrous material substantially solvent resistant comprises:

irradiating an aromatic polyester of the recurring structural formula

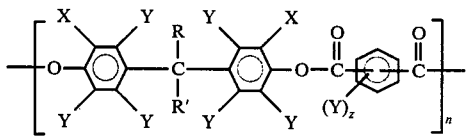

where X which may be the same or different is chlorine or bromine, Y which may be the same or different is hydrogen, chlorine or bromine, $z$ is 4, R and R' may be the same or different and represent lower alkyl groups, hydrogen, or together constitute a cyclic hydrocarbon group, $n$ = at least 10, by exposing said halogenated fibrous material to low intensity and low energy ultraviolet light radiation consisting essentially of wavelengths from 1000 A to 3900 A, with a source intensity of from about 100 to 400 watts per linear inch for a period of time not to exceed 10 seconds.

DESCRIPTION OF THE PREFERRED EMBODIMENTS

The halogenated fibrous material of this invention has recurring units of either of the structural formulas I or II:

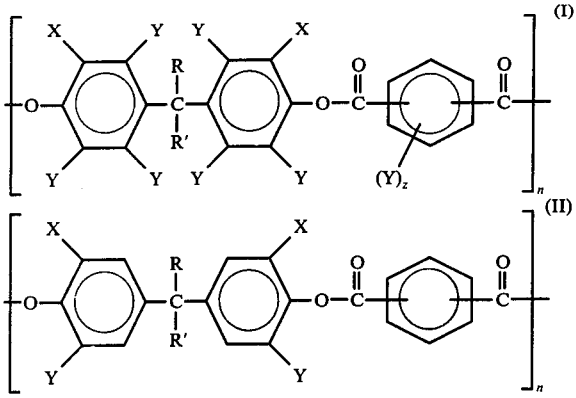

where X which may be the same or different is chlorine or bromine, Y which may be the same or different is hydrogen, chlorine or bromine, z is 4, R and R' may be the same or different and represent lower alkyl groups (e.g., 1 to 5 carbon atoms), hydrogen, or together constitute a cyclic hydrocarbon group, and n = at least 10 (e.g., n = about 20 to 400). Formula II illustrates the polyester wherein the phthaloyl portion is non-halogenated while Formula I illustrates the polyester wherein the phthaloyl portion of the polymer may be halogenated. Such halogenated aromatic polyesters are non-ethylenically unsaturated. Commonly the aromatic polyester utilized in the present invention has a chlorine and/or bromine content of about 15 to 60 percent by weight based upon the weight of the aromatic polyester, e.g., a chlorine and/or bromine content of about 25 to 50 percent by weight. As is apparent from the structural formula, the aromatic polyester is chlorinated or brominated in the sense that these substituent groups are directly attached to an aromatic ring which ring may comprise the alcohol and/or acid derived portion of the polyester. In a particularly preferred embodiment the halogen substituents are all bromine.

The end groups of the aromatic polyester illustrated in the formula commonly are —OH, or

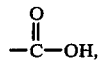

depending upon the synthesis route selected as will be apparent to those skilled in the art. Suitable methods for the manufacture of such aromatic polyesters are disclosed in U.S. Pat. Nos. 2,035,578; 3,234,167; and 3,824,213; Australian Pat. No. 242,803; British Pat. No. 924,607; and commonly assigned U.S. Ser. No. 527,613, filed Nov. 27, 1974, and issued as U.S. Pat. No. 3,948,856 which are herein incorporated by reference. The chlorinated or brominated aromatic polyester may be formed by the condensation of tetrachlorobisphenol A (i.e., 4,4'-isopropylidene-2,2',6,6'-tetrachlorodiphenol) or tetrabromobisphenol A (i.e., 4,4'-isopropylidene-2,2',6,6'-tetrabromodiphenol) with halogenated or non-halogenated (as illustrated by Formula II) isophthalic acid and/or terephthalic acid or the ester forming derivatives thereof.

A preferred chlorinated aromatic polyester is formed by the condensation of tetrachlorobisphenol A (i.e., 4,4'-isopropylidene-2,2',6,6'-tetrachlorodiphenol) with an aromatic acid mixture of about 90 to 40 percent isophthalic acid (e.g., 80 to 60 percent by weight) and correspondingly about 10 to 60 percent by weight terephthalic acid (e.g., 20 to 40 percent by weight) or the ester forming derivatives thereof. For instance, tetrachlorobisphenol A may be reacted with a mixture of terephthalic acid and isophthalic acid or ester forming derivatives thereof in the presence of an appropriate solvent and a catalyst. A preferred brominated aromatic polyester is formed by the condensation of tetrabromobisphenol A (i.e., 4,4'-isopropylidene-2,2',6,6'-tetrabromodiphenol) with an aromatic acid mixture of about 45 to 75 percent by weight (e.g., 60 percent by weight) isophthalic acid and correspondingly about 55 to 25 percent by weight (e.g., 40 percent by weight) terephthalic acid or the ester forming derivatives thereof. For instance, tetrabromobisphenol A may be reacted with a mixture of isophthaloyl chloride and terephthaloyl chloride in the presence of an appropriate solvent and catalyst to produce a polymer having —OH and

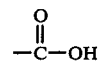

end groups.

The resulting halogenated polyester may be solution spun from a methylene chloride spinning solvent into an evaporative air atmosphere to form a filamentary material which may be hot drawn, crimped, cut, and provided in a variety of physical configurations by a variety of mechanical techniques such as twisting, reverse twisting and false twisting. For instance, the fibrous material which serves as a starting material may be provided as fluff, sliver, yarns, tows, rovings, fibrids, filaments, e.g., and may consist of staple or continuous fibers. If desired, the fibrous material may be present as a fiber assemblage when irradiated, e.g., as a woven or knitted fabric. Alternatively, other fiber types may be blended with the halogenated aromatic polyester fibers at the time of irradiating.

The halogenated aromatic polyester fibrous material which undergoes irradiation in the present process optionally may include a minor portion of an oxide of antimony, e.g., antimony trioxide ($Sb_2O_3$) or antimony pentoxide ($Sb_2O_5$), or other flame retardant additive intimately dispersed therein.

The radiation which is employed in the practice of this invention has a wavelength of from about 1000 A to about 3900 A, i.e., the range commonly referred to as the ultraviolet range. The radiation source may have areas of discontinuity within the spectrum of wavelengths produced provided these areas do not exist at the peak absorption wavelengths characterized by the natural frequency of the molecules of the substrate irradiated. This eliminates the need for high intensity radiation sources which may be characterized as providing a predominantly continuum radiation as utilized in the prior art as opposed to low intensity, line, or peak radiation souces which are characterized as providing a radiation spectrum with band widths of less than 100 Angstroms, as utilized in the presently claimed invention. Accordingly, the ultraviolet radiation may be derived from any suitable low intensity low energy source known to those skilled in the art, such as a quartz mercury arc, flash photolysis lamps and U.V. lasers. However, ultraviolet radiation from very low wattage (e.g., 1.0 to 15.0 watts) lamps are commercially unsuitable.

The source intensity of such lamps typically may vary from 100 watts to 400 watts per linear inch preferably from 200 watts to 300 watts per linear inch, most preferably from 100 watts to 200 watts per linear inch.

The invention is carried out by exposing the non-ethylenically unsaturated chlorinated or brominated aromatic polyester to low intensity low energy ultraviolet light as hereinabove defined for a time sufficient to render them resistant to dry cleaning solvents.

The period of exposure depends on the intensity of the radiation source and the thickness of the fibrous substrate.

Generally, the length of the lamp utilized as the source of ultraviolet radiation will correspond to the width of the material being irradiated. Commercial U.V. lamps are available in lengths which may vary from 1 to 8 feet.

The irradiation may be carried out in a continuous or batch process and any apparatus limitations as hereinafter described should not be construed as a limitation on the basic invention described herein.

The average penetration of the emitted radiation into the fibrous material is roughly inversely proportional to its wavelength and inversely proportional to the density of matter irradiated, with small correction factors for the atomic number of the absorbing material. Generally, if it is desired to assure passage of the emitted radiation all the way through the sample, it is preferably to employ fibrous polymer samples which have a thickness which may vary from 1/32 inch to ¼inch, most preferably 1/16 inch to ⅛ inch. Thicker samples can be treated by irradiating opposite surfaces in subsequent passes. Because of the narrow range of wavelengths employed it is difficult to control penetration by varying the wavelength of the emitted radiation.

In view of the above, the period of exposure of the fibrous substrate described herein and possessing fibers of ⅛ inch thickness to ultraviolet light emitted from a lamp with a source intensity of about 5.0 watts per linear inch is about 20 minutes. A lamp with a source intensity of from 100 to 200 watts per linear inch may require an exposure of time of from 1 to 10 seconds or less (e.g., .1 to 1.0 seconds for a lamp with an intensity of 200 to 300 watts per linear inch). The fibers of a substrate which are ¼ inch in thickness, may require a period of exposure of 2 seconds or less with a lamp with a source intensity of 200 to 400 watts per linear inch.

Over exposure to a lamp with an intensity much greater than 200 watts per linear inch may result in degradation which takes the form of discoloration, brittleness due to excessive crosslinking, lessened strength, dullness, and even charring.

It is preferred to use a lamp with a source intensity of 200 watts per linear inch, a fiber thickness of ⅛ inch, and an exposure time of 1 second.

A preferred method for practicing the invention is to continuously pass in the direction of its length a continuous length of the chlorinated or brominated aromatic polyester fibrous polymer (e.g., yarn, tow, or woven fabric) through a beam of ultraviolet radiation as hereinabove described. The window of the radiation source commonly is maintained at about 1 inch to 10 inches, (e.g., from about 1 to about 5 inches) from the specimen. The cross-sectional area of the irradiated material covered by the window of radiation may vary from about 20 square inches to 3500 square inches, (e.g., from about 48 square inches to about 1500 square inches). The exposure time may vary from about 0.1 seconds to about 10 seconds, preferably from about 0.5 seconds to about 5 seconds, most preferably from about 1 second to about 2 seconds, depending on factors considered in the above discussion.

Thus, a continuous length sample may be passed through the ultraviolet beam with a source intensity of 200 watts per linear inch at a rate which provides a time of passage for a point through a beam of ultraviolet light of about 1 second. The window of the radiation source is maintained at 3 inches from the specimen undergoing treatment and covers a cross-sectional area of 2 inches wide and 12 inches long. This is hereinafter defined as a standard pass.

The temperature during irradiation may vary from about 0° C to about 150° C, preferably from 10° C to about 60° C, most preferably from about 25° C to about 40° C (i.e., below the temperature where individual fibers melt or become coalesced). Although temperature is not particularly critical it may be desirable to provide an inert atmosphere such as nitrogen to protect the polyester from oxidation at elevated temperatures. An inert atmosphere may also provide faster reaction times.

The irradiation of the halogenated aromatic fibrous polyester material generates free radicals within the fibrous material which react to produce sufficient crosslinking to impart solvent resistance without a significant detrimental change to other product properties.

Solvents to which the above-mentioned fibers become resistant to include tri-chloroethylene, methylene chloride, tetrachloroethane, tetrachloroethylene, perchlorinated ethylene and ethane, carbon tetrachloride, chloroform, and Stoddard solvent. Other solvents to which the polyester material is resistant include common organic hydrocarbon solvents such as alcohols, ketones, esters and ethers.

The resulting irradiated halogenated aromatic polyester fibrous materials may be utilized in both textile and non-textile applications. For instance, carpets, textiles, wall coverings, hospital cubicle draperies, children's sleepwear, flight suits, slippers, upholstery, thread, apparel, etc. may be formed from the same.

The following examples are given as specific illustrations of the claimed invention. It should be understood, however, that the invention is not limited to the specific details set forth in the examples.

EXAMPLE I

A chlorinated aromatic polyester containing chlorine chemically bound to an aromatic ring is formed by reacting 190.9 parts by weight of tetrachlorobisphenol A and a mixture of 75.6 parts by weight isophthaloyl chloride and 32.4 parts by weight terephthaloyl chloride. The resulting chlorinated polyester possesses structural Formula II heretofore illustrated where X and Y are chlorine, groups R and R' are methyl groups, and $n$ = about 80. The chlorinated aromatic polyester has a chlorine content of about 27 percent by weight, and an inherent viscosity of about 0.8 deciliters per gram determined at a concentration of 0.1 percent by weight in a solvent which is a mixture of 10 parts by weight phenol and 7 parts by weight trichlorophenol.

The chlorinated aromatic polyester is solution spun from a methylene chloride spinning solvent into an evaporative air atmosphere to form a filamentary material ⅛ inch in thickness which is hot drawn, and cut into 1½ inch lengths, and provided in a staple configuration.

The chlorinated polyester so prepared is tested for its solvent resistance before and after exposure to the ultraviolet radiation. Thus several non-irradiated samples of the above described chlorinated polyester each weighing 5 gms. are placed in 95 c.c. of chloroform (solvent) and maintained at a temperature of 25° C and a pressure of 760 mm. At the same time several other samples of the same product each weighing 5 gms. are irradiated under conditions of a standard pass as hereinabove described and are then placed in 95 c.c. of chloroform (solvent) under the same conditions of temperature and pressure.

The non-irradiated samples dissolve completely in 60 seconds, while the irradiated samples fail to dissolve to any substantial degree over a period of 6 months.

EXAMPLE II

Example I is repeated with the exception that a brominated aromatic polyester containing bromine chemically bound to an aromatic ring is substituted for the chlorinated aromatic polyester. More specifically, the brominated aromatic polyester is formed by reacting 201.7 parts by weight tetrabromobisphenol A and a mixture of 46 parts by weight isophthaloyl chloride and 30.8 parts by weight terephthaloyl chloride. The resulting brominated aromatic polyester possesses structural Formula II heretofore illustrated where X and Y are bromine, R and R' are methyl groups, and $n$ = about 5.0. The brominated aromatic polyester has a bromine content of about 48 percent by weight, and exhibits an inherent viscosity of about 0.75 deciliters per gram determined at a concentration of 0.1 percent by weight in a solvent which is a mixture of 10 parts by weight of phenol and 7 parts by weight trichlorophenol.

The brominated aromatic polyester is solution spun from a methylene chloride spinning solvent into an evaporative air atmosphere to form a filamentary material ⅛ inch in thickness which is hot drawn, cut into 1½ inch lengths, and provided in a staple configuration.

The brominated polyester so prepared is tested for its solvent resistance before and after exposure to the ultraviolet radiation. Thus, several non-irradiated samples of the above described brominated polyester each weighing 5 gms. are placed in 95 c.c. of chloroform and maintained at a temperature of 25° C and a pressure of 760 mm. At the same time several other samples of the same product each weighing 5 gms. are irradiated under conditions of a standard pass as hereinabove described and were then placed in 95 c.c. of chloroform under the same conditions of temperature and pressure.

The non-irradiated samples dissolve completely in 60 seconds, while the irradiated samples fail to dissolve to any substantial degree over a period of 6 months.

EXAMPLE III

Example I is repeated except that 147.5 parts by weight of dichlorobisphenol A and a mixture of 73.1 parts by weight isophthaloyl chloride and 28.4 parts by weight terephthaloyl chloride were added. The resulting chlorinated aromatic polyester possesses structural Formula II heretofore illustrated where X is chlorine, Y is hydrogen, groups R and R' are methyl groups, and $n$ = 65. The chlorine content of this chlorinated aromatic polyester is about 17 percent by weight, and exhibits an inherent viscosity of about 0.81 deciliters per gram determined at a concentration of 0.1 percent by weight in a solvent which is a mixture of 10 parts by weight of phenol and 7 parts by weight trichlorophenol.

The chlorinated aromatic polyester is spun into a filamentary material and tested for solvent resistance as described in Example I.

The non-irradiated samples dissolve completely in 60 seconds, while the irradiated samples fail to dissolve to any substantial degree over a period of 6 months.

EXAMPLE IV

Example II is repeated except that 192 parts by weight of dibromobisphenol A and a mixture of 71.1 parts by weight isophthaloyl chloride and 30.5 parts by weight of terephthaloyl chloride was added. The resulting brominated aromatic polyester possesses structural Formula II heretofore illustrated where X is bromine, Y is hydrogen, groups R and R' are methyl groups, and $n$ = 72. The bromine content of this brominated aromatic polyester is about 31 percent by weight and exhibits an inherent viscosity of about 0.84 deciliters per gram similarly determined as in Example I.

The brominated aromatic polyester is spun into a filamentary material and tested for solvent resistance as described in Example I.

The non-irradiated samples dissolved completely in 60 seconds, while the irradiated samples fail to dissolve to any substantial degree over a period of 6 months.

EXAMPLE V

Example I is repeated with the exception that a chlorinated aromatic polyester containing chlorine chemically bound to the isophthalic and terephthalic acid derived portion of the polyester is substituted for the polyester of Example I which contains a non-halogenated phthalic acid derived portion. More specifically, the chlorinated aromatic polyester is formed by reacting 190.9 parts by weight of tetrachlorobisphenol A and a mixture of 88.5 parts by weight of o-chloroisophthaloyl chloride and 37.9 parts by weight of o-chloro-terephthaloyl chloride. The resulting chlorinated polyester possesses structural Formula I heretofore illustrated wherein X is chlorine, a single Y substituent on the phthaloyl portion of the formula is chlorine the remainder of the Y groups being hydrogen, R and R' are methyl groups, and $n$ equals about 80. The chlorinated aromatic polyester has a chlorine content of about 33 percent by weight.

The chlorinated aromatic polyester is solution spun from a methylene chloride spinning solvent, into an evaporative air atmosphere to form a filamentary material ⅛ inch in thickness which is hot drawn, and cut into 1½ inch length, and provided in a staple configuration.

The chlorinated polyester so prepared is tested for its solvent resistance before and after exposure to the ultraviolet radiation.

The non-irradiated samples dissolve completely in 60 seconds while the irradiated samples fail to dissolve to any substantial degree over a period of 6 months.

EXAMPLE VI

Example I is repeated with the exception that a chlorinated aromatic polyester containing chlorine chemically bound to the isophthalic and terephthalic acid derived portion of the polyester is substituted for the polyester of Example I which contains a non-halogenated phthalic acid derived portion. More specifically, the chlorinated aromatic polyester is formed by reacting 190.9 parts by weight of tetrachlorobisphenol A with a mixture of 101.3 parts by weight of o-dichloro-isophthaloyl chloride with 43 parts by weight of o- dichloro-terephthaloyl chloride. The resulting chlorinated polyester possesses structural Formula I heretofore illustrated where X is chlorine, two of the Y substituents bound to the isophthalic and terephthalic acid derived portion of the polyester are chlorine, the remainder of the Y groups being hydrogen, R and R' are methyl groups, and n equals about 80. The chlorinated aromatic polyester has a chlorine content of about 38% by weight.

The chlorinated aromatic polyester is solution spun from a methylene chloride spinning solvent into an evaporative air atmosphere to form a filamentary material ½ inch in thickness which is hot drawn, and cut into 1½ lengths and provided in a staple configuration.

The chlorinated polyester so prepared is tested in accordance with the procedure outlined in Example I.

The non-irradiated samples dissolve completely in 60 seconds, while the irradiated samples fail to dissolve to any substantial degree over a period of six months.

EXAMPLE VII

Example V is repeated except that tetrabromobisphenol A, o-bromo-isophthaloyl chloride and o-bromo-terephthaloyl chloride is substituted in equivalent ratios for the tetra-chlorobisphenol A, o-chloro-isophthaloyl chloride and o-chloro-terephthaloyl chloride, respectively of Example V.

The non-irradiated samples dissolved completely in 60 seconds, while the irradiated samples failed to dissolve to any substantial degree over a period of 6 months.

EXAMPLE VIII

Example VI is repeated except that tetrabromobisphenol A, o-dibromo-isophthaloyl chloride, and o-dibromo-terephthaloyl chloride is substituted in equivalent ratios for the tetrachloro-bisphenol A, o-dichloro isophthaloyl chloride, and o-dichloroterephthaloyl chloride respectively of Example VI.

The non-irradiated samples dissolved completely in 60 seconds, while the irradiated samples failed to dissolve to any substantial degree over a period of 6 months.

Although the invention has been described with preferred embodiments, it is to be understood that variations and modifications may be resorted to as will be apparent to those skilled in the art. Such variations and modifications are to be considered within the purview and the scope of the claims appended hereto.

We claim:

1. A process for enhancing the solvent resistance of a halogenated fibrous material which consists essentially of irradiating an aromatic polyester of the recurring structural formula

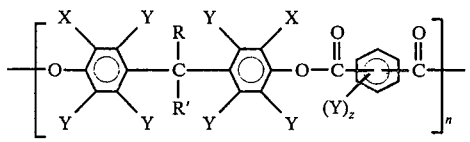

where X which may be the same or different is chlorine or bromine, Y which may be the same or different is hydrogen, chlorine or bromine, z is 4 and R and R' may be the same or different and represent lower alkyl groups, hydrogen, or together constitute a cyclic hydrocarbon group, n = at least 10, by exposing said halogenated fibrous material to low intensity low energy ultraviolet light radiation of a wavelength which consists essentially of 1000 A to 3900 A, and a source intensity of from 100 to 400 watts per linear inch for a period of time not to exceed 10 seconds, said source intensity and duration of exposure being selected to achieve enhanced solvent resistance.

2. The process of claim 1 wherein said halogenated fibrous material is irradiated with light of a source intensity of from about 200 to 300 watts per linear inch for a period of from .1 to 1 second.

3. The process of claim 1 wherein said halogenated fibrous material is irradiated with light of a source intensity of about 100 to 200 watts per linear inch for a period of from about 1 to 10 seconds.

4. A process for enhancing the solvent resistance of a halogenated fibrous material which consists essentially of irradiating an aromatic polyester of the recurring structural formula

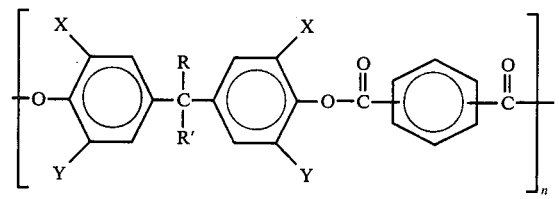

ps where X may be the same or different is chlorine or bromine, Y which may be the same or different is hydrogen, chlorine or bromine, R and R' may be the same or different and represent lower alkyl groups, hydrogen, or together constitute a cyclic hydrocarbon group, n = at least 10 by exposing said halogenated fibrous material to low intensity low energy ultraviolet light radiation of a wavelength which consists essentially from 1000 A to 3900 A, and a source intensity of from 100 to 400 watts per linear inch for a period of time not to exceed 10 seconds, said source intensity and duration of exposure being selected to achieve enhanced solvent resistance.

5. The process according to claim 4 wherein X = Br and said halogenated fibrous material of the recurring structural formula is a product of a tetrabromobisphenol and a mixture of about 45 to 75 percent by weight isophthalic acid or the ester forming derivatives thereof and correspondingly about 55 to 25 percent by weight terephthalic acid or the ester forming derivatives thereof.

6. The process according to claim 4 wherein said halogenated fibrous material of the recurring structural formula is a product of tetrabromobisphenol A, and a mixture of about 60 percent by weight isophthaloyl chloride and correspondingly about 40 percent by weight terephthaloyl chloride.

7. The process according to claim 4 wherein X = Cl and said halogenated fibrous material of the recurring structural formula is a product of a tetrachlorobisphenol and a mixture of 80 to 60 percent by weight isophthalic acid or the ester forming derivatives thereof and correspondingly about 20 to 40 percent by weight of terephthalic acid or the ester forming derivatives thereof.

8. The process according to claim 4 wherein said halogenated fibrous material of the recurring structural formula is a product of tetrachlorobisphenol A and a mixture of about 70 percent by weight isophthaloyl chloride and correspondingly about 30 percent by weight of terephthaloyl chloride.

9. The process of claim 4 wherein the fibers of said halogenated fibrous material of the recurring structural formula are arranged in configuration selected from the group consisting essentially of yarn, tow and fabric.

10. The process of claim 4 wherein said halogenated fibrous material is provided as a continuous length and is irradiated while being continuously passed in the direction of its length through said low intensity ultraviolet light radiation.

11. The process of claim 4 wherein said halogenated fibrous material is irradiated with light of a source intensity of from about 200 to 300 watts per linear inch for a period of from 0.1 to 1 second.

12. The process of claim 4 wherein said halogenated fibrous material is irradiated with light of a source intensity of about 100 to 200 watts per linear inch for a period of from about 1 to 10 seconds.

13. A substantially solvent resistant fibrous material which consists essentially of, a halogenated polyester of the recurring structural formula

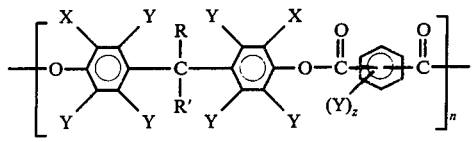

where X which may be the same or different is chlorine or bromine, Y which may be the same or different is hydrogen, chlorine or bromine, $z = 4$, and R and R' may be the same or different and represent lower alkyl groups, hydrogen, or together constitute a cyclic hydrocarbon group group, $n = $ at least 10, wherein said solvent resistance is imparted to said halogenated fibrous material by exposure to low intensity low energy ultraviolet light radiation of a wavelength which consists essentially of 1000 A to 3900 A and a source intensity of from about 100 to 400 watts per linear inch for a period of time not to exceed 10 seconds said source intensity and duration of exposure being selected to achieve enhanced solvent resistance.

14. The product according to claim 13 where X = Br and wherein said halogenated fibrous material of the recurring structural formula is a product of a tetrabromobisophenol and a mixture of about 45 to 75 percent by weight isophthalic acid or the ester forming derivaties thereof, and correspondingly about 55 to 45 percent by weight terephthalic acid or the ester forming derivatives thereof.

15. The product according to claim 13 wherein said halogenated fibrous material of the recurring structural formula is a product of tetrabromobisphenol A and a mixture of about 60 percent by weight isophthaloyl chloride and correspondingly about 40 percent by weight terephthaloyl chloride.

16. The product according to claim 13 wherein X = Cl and said halogenated fibrous material of the recurring structural formula is a product of a tetrachlorobisphenol and a mixture of 80 to 60 percent by weight isophthalic acid or the ester forming derivative thereof and correspondingly about 20 to 40 percent by weight terephthalic acid or the ester forming derivatives thereof.

17. The product of claim 13 wherein said halogenated fibrous material of the recurring structural formula is a product of tetrachlorobisphenol A and a mixture of about 70 percent by weight isophthaloyl chloride and correspondingly about 30 percent by weight of terephthaloyl chloride.

18. The process of claim 13 wherein the solvent resistance is imparted to said halogenated fibrous material by exposure to light with a source intensity of about 100 to 200 watts per linear inch for a period of from about 1 to 10 seconds.

19. The process of claim 13 wherein the solvent resistance is imparted to said halogenated fibrous material by exposure to light with a source intensity of about 200 to 300 watts per linear inch for a period of from about 0.1 to about 1.0 seconds.

* * * * *